United States Patent
Kouno

(10) Patent No.: US 10,920,000 B2
(45) Date of Patent: Feb. 16, 2021

(54) LIGHT DIFFUSING AGENT, LIGHT DIFFUSING RESIN COMPOSITION AND MOLDED BODY

(71) Applicant: MITSUBISHI GAS CHEMICAL COMPANY, INC., Tokyo (JP)

(72) Inventor: Kazuki Kouno, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 84 days.

(21) Appl. No.: 16/073,083

(22) PCT Filed: Jan. 20, 2017

(86) PCT No.: PCT/JP2017/001864
§ 371 (c)(1),
(2) Date: Jul. 26, 2018

(87) PCT Pub. No.: WO2017/135066
PCT Pub. Date: Aug. 10, 2017

(65) Prior Publication Data
US 2019/0031799 A1 Jan. 31, 2019

(30) Foreign Application Priority Data
Feb. 5, 2016 (JP) .............................. JP2016-020431

(51) Int. Cl.
| | | |
|---|---|---|
| *C08F 220/30* | (2006.01) | |
| *G02B 5/02* | (2006.01) | |
| *C08F 220/38* | (2006.01) | |
| *C08F 220/18* | (2006.01) | |
| *C08F 236/10* | (2006.01) | |
| *C08L 33/08* | (2006.01) | |
| *C08L 67/00* | (2006.01) | |
| *C08L 69/00* | (2006.01) | |
| *C08F 220/28* | (2006.01) | |

(52) U.S. Cl.
CPC .......... *C08F 220/30* (2013.01); *C08F 220/18* (2013.01); *C08F 220/28* (2013.01); *C08F 220/38* (2013.01); *C08F 236/10* (2013.01); *C08L 33/08* (2013.01); *C08L 67/00* (2013.01); *C08L 69/00* (2013.01); *G02B 5/02* (2013.01); *C08F 220/305* (2020.02); *C08F 2500/24* (2013.01); *C08F 2800/20* (2013.01)

(58) Field of Classification Search
None
See application file for complete search history.

(56) References Cited

U.S. PATENT DOCUMENTS

| | | | | |
|---|---|---|---|---|
| 9,988,548 B2 * | 6/2018 | Hoess | ................... | C08L 51/003 |
| 10,081,729 B2 * | 9/2018 | Kouno | ................... | C08F 220/18 |
| 2010/0240831 A1 * | 9/2010 | Kim | ................... | C08L 69/00 |
| | | | | 524/878 |
| 2013/0171438 A1 * | 7/2013 | Hayashi | ................... | B32B 7/02 |
| | | | | 428/220 |
| 2014/0058038 A1 * | 2/2014 | Hunt | ................... | C08J 7/16 |
| | | | | 524/783 |
| 2014/0128562 A1 | 5/2014 | Kobayashi et al. | | |
| 2015/0284556 A1 | 10/2015 | Sugiyama et al. | | |

FOREIGN PATENT DOCUMENTS

| | | |
|---|---|---|
| EP | 1857469 | 11/2007 |
| EP | 3495397 | 6/2019 |
| JP | 6-59107 A | 3/1994 |
| JP | 7-234304 A | 9/1995 |
| JP | 9-281339 A | 10/1997 |
| JP | 11-302330 A | 11/1999 |
| JP | 2004-155984 A | 6/2004 |
| JP | 2006-307200 A | 11/2006 |
| JP | 2008-94987 A | 4/2008 |
| JP | 2010-248358 A1 | 11/2010 |
| JP | 2012-82387 A | 4/2012 |

(Continued)

OTHER PUBLICATIONS

JP-2012251107-A, Feb. 2012, Machine translation (Year: 2012).*

(Continued)

*Primary Examiner* — Satya B Sastri
(74) *Attorney, Agent, or Firm* — Greenblum & Bernstein, P.L.C.

(57) ABSTRACT

The present invention provides: a light diffusing agent which enables the achievement of a resin molded body having excellent light diffusibility, light transmission properties, surface hardness and the like; a resin composition which contains this light diffusing agent; and a molded body. One embodiment of the present invention provides a light diffusing agent which contains a copolymer that contains a (meth)acrylate constituent unit (A) represented by general formula (1) and a polyvalent vinyl constituent unit (B) that is copolymerizable with the constituent unit (A).

(1)

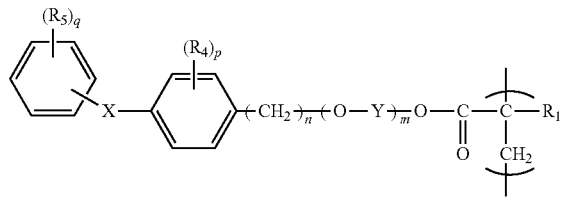

13 Claims, No Drawings

(56) References Cited

FOREIGN PATENT DOCUMENTS

| | | | |
|---|---|---|---|
| JP | 2012251107 A | * 12/2012 | |
| JP | 2013-053310 A | 3/2013 | |
| JP | 2014-118480 A | 6/2014 | |
| TW | 201546153 A | 12/2015 | |
| WO | 2014/069332 A1 | 5/2014 | |
| WO | WO-2015053145 A1 * | 4/2015 | ............ C08F 220/14 |
| WO | 2015/178501 A1 | 11/2015 | |

OTHER PUBLICATIONS

Official Communication issued in European Patent Office (EPO) Patent Application No. 17747225.5, dated Aug. 19, 2019.
International Search Report in International Patent Application No. PCT/JP2017/001864, dated Apr. 18, 2017.
International Preliminary Report on Patentability in International Patent Application No. PCT/JP2017/001864, dated Aug. 7, 2018.
European Office Action, EPO, Application No. 17747225.5, dated Jun. 15, 2020.

\* cited by examiner

LIGHT DIFFUSING AGENT, LIGHT DIFFUSING RESIN COMPOSITION AND MOLDED BODY

TECHNICAL FIELD

The present invention relates to a light diffusing agent, a light diffusing resin composition containing a base resin and the light diffusing agent, and a molded body thereof.

BACKGROUND ART

Resin molded bodies having light diffusibility are widely used for applications requiring light diffusibility such as covers of lighting equipments, backlights in display devices of personal computers, televisions, etc., automobile meters and signboards. In these applications, in order to uniformly diffuse light from a light source, a molded body (e.g., sheet, film, etc.) of a resin composition, which is obtained by dispersing a light diffusing agent in a transparent base resin such as an acrylic resin, a polystyrene-based resin, a polycarbonate-based resin and a polyethylene-based resin, is used. As the light diffusing agent, an organic particle having a crosslinked structure such as a crosslinked acrylic particle, a crosslinked silicone-based particle and a crosslinked styrene-based particle; an inorganic particle such as calcium carbonate, barium sulfate, aluminium hydroxide, silicon dioxide, titanium oxide and calcium fluoride; an inorganic fiber such as short glass fiber; or the like is conventionally used. Further, these light diffusing agents can impart matte effect to the surface of a coating film when being blended in a paint, ink or the like, and therefore are widely used as a matting agent for paint to be used for building materials, automobiles, etc.

Among characteristics of resin molded bodies to be used for the above-described applications, light transmission properties and light diffusibility are most important, and it is desired to transmit light as much as possible and to entirely diffuse light. Accordingly, researches for developing and improving a light diffusing agent and finding an appropriate combination of a base resin and a light diffusing agent have been made in order to obtain a molded body which can achieve a balance between light transmission properties and light diffusibility.

In general, there is a tendency that when the adding amount of a light diffusing agent is increased, light diffusibility is improved but light transmission properties are reduced. For this reason, it is not easy to achieve a balance between light transmission properties and light diffusibility. Further, required optical properties (for example, degrees of light transmission properties and light diffusibility) vary depending on intended use. For this reason, various resin molded bodies and light diffusing agents, each of which has optical properties depending on intended use, have been developed. Moreover, recently, importance has been gradually placed on physical properties including heat resistance, weatherability, flame retardance and impact resistance in addition to optical properties including light transmission properties and light diffusibility with expanded uses of light diffusing resin molded bodies.

For example, Patent Document 1 discloses a light diffusing sheet containing a light diffusing agent which is an inorganic particle of zirconium oxide or the like and a transparent resin. However, the inorganic particle used as the light diffusing agent in this case has a problem that light transmission properties are reduced because light which enters into the light diffusing sheet is reflected and a problem that the strength of the light diffusing sheet is reduced, which are caused by a large difference between the refractive index of such a particle and that of a base resin and a large surface area of such a particle.

Patent Document 2 discloses a light diffusing agent consisting of a particle of a sulfur-containing polymer. Since the light diffusing agent of Patent Document 2 is an organic particle, the problem caused by using the above-described inorganic particle is not caused, but a problem of odor due to contained sulfur atoms and a problem of low weatherability are caused.

Patent Document 3 describes that a copolymer containing a divinylbiphenyl compound as a structural unit is used as a light diffusing agent. Patent Document 3 describes that a balance between excellent light diffusibility and light transmission properties can be achieved by this light diffusing agent, but due to the contained divinylbiphenyl compound, problems such as reduction in dispersibility in a base resin and reduction in surface hardness may arise.

Though various light diffusing agents have been developed as described above, it is desired to develop not only a light diffusing agent which can impart high light diffusibility and light transmission properties to a resin molded body, but also a light diffusing agent which can impart preferable physical properties other than optical properties to a resin molded body, a light diffusing agent which can provide a resin molded body in which a balance between optical properties and other physical properties is achieved, etc. That is, it is desired to develop a light diffusing agent which can impart desirable properties depending on an application of a light diffusing resin molded body.

PRIOR ART DOCUMENTS

Patent Documents

Patent Document 1: Japanese Laid-Open Patent Publication No. H06-59107

Patent Document 2: Japanese Laid-Open Patent Publication No. H09-281339

Patent Document 3: Japanese Laid-Open Patent Publication No. H11-302330

SUMMARY OF THE INVENTION

Problems to be Solved by the Invention

The objective of the present invention is to provide a light diffusing agent which makes it possible to obtain a resin molded body having excellent light diffusibility, light transmission properties, surface hardness and the like, a resin composition containing the same, and a molded body.

Means for Solving the Problems

The present inventors diligently made researches in order to solve the above-described problems and found that a resin molded body having excellent light diffusibility, light transmission properties, surface hardness, etc. can be obtained by using a polymer particle obtained by copolymerizing a (meth)acrylate monomer having a specific skeleton and a polyvalent vinyl-based monomer as a light diffusing agent, and thus the present invention was achieved. Specifically, the present invention is, for example, as follows:

[1] A light diffusing agent which contains a copolymer that contains:
a (meth)acrylate structural unit (A) represented by general formula (1); and
a polyvalent vinyl structural unit (B) that is copolymerizable with the structural unit (A)

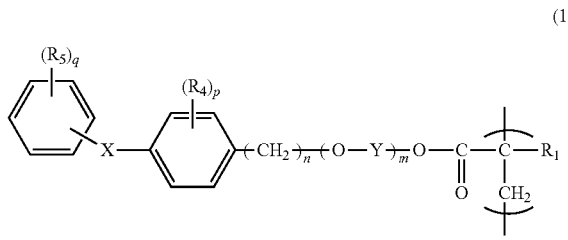
(1)

wherein:
X represents a divalent group selected from the group consisting of a single bond, $-C(R_2)(R_3)-$, $-C(=O)-$, $-O-$, $-OC(=O)-$, $-OC(=O)O-$, $-S-$, $-SO-$, $-SO_2-$ and any combination thereof, wherein $R_2$ and $R_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group; or $R_2$ and $R_3$ may be bonded to each other so as to form a cyclic alkyl group having 3 to 10 carbon atoms together with a carbon atom to which they are attached;
Y represents a branched or unbranched alkylene group having 2 to 6 carbon atoms, a cycloalkylene group having 6 to 10 carbon atoms or an arylene group having 6 to 10 carbon atoms;
$R_1$ represents a hydrogen atom or a methyl group;
$R_4$ and $R_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a phenylphenyl group;
m represents an integer of 0 to 10;
n represents an integer of 1 or 2;
p represents an integer of 0 to 4; and
q represents an integer of 0 to 5.

[2] The light diffusing agent according to item [1], wherein m represents an integer of 0 to 3.
[3] The light diffusing agent according to item [1] or [2], wherein X represents a single bond, $-C(R_2)(R_3)-$, $-C(=O)-$, $-O-$, $-SO-$ or $-SO_2-$.
[4] The light diffusing agent according to any one of items [1] to [3], wherein both p and q represent 0.
[5] The light diffusing agent according to any one of items [1] to [4], wherein the structural unit (B) is a divinyl structural unit.
[6] The light diffusing agent according to item [5], wherein the structural unit (B) is a bisphenol-based or naphthyl-based divinyl structural unit.
[6-1] The light diffusing agent according to any one of items [1] to [6], wherein the structural unit (B) comprises a structural unit derived from a compound represented by general formula (2) or a structural unit derived from a compound represented by general formula (3)

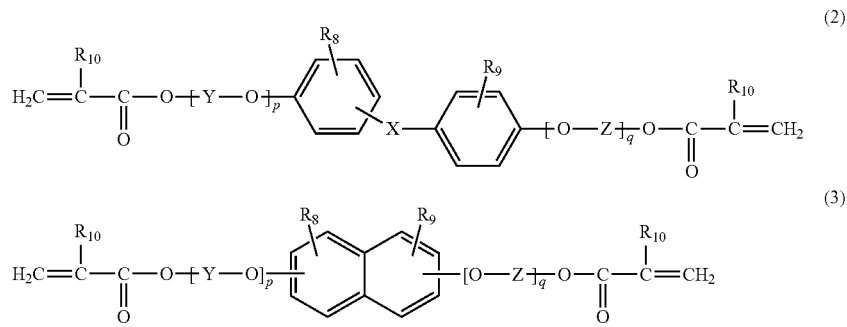
(2)
(3)

wherein:
X represents a divalent group selected from a single bond, $-[C(R_6)(R_7)]_n-$, $-C(=O)-$, $-O-$, $-SO-$ and $-SO_2-$, wherein $R_6$ and $R_7$ are each independently selected from a hydrogen atom, a methyl group, a phenyl group and a phenylphenyl group; or $R_6$ and $R_7$ are bonded to each other so as to form a cyclic alkyl group having 3 to 13 carbon atoms together with a carbon atom to which they are attached; and n represents an integer of 1 to 10;
$R_8$ and $R_9$ are each independently selected from a hydrogen atom, an alkyl group having 1 to 20 carbon atoms, an alkoxyl group having 1 to 20 carbon atoms, a cycloalkyl group having 3 to 20 carbon atoms, a cycloalkoxyl group having 5 to 20 carbon atoms, an aryl group having 6 to 20 carbon atoms, an aryloxy group having 6 to 20 carbon atoms, and a halogen atom;
$R_{10}$ represents a hydrogen atom or a methyl group;
Y and Z each independently represent a branched or unbranched alkylene group having 2 to 6 carbon atoms, a cycloalkylene group having 6 to 10 carbon atoms or an arylene group having 6 to 10 carbon atoms; and
p and q each independently represent an integer of 0 to 4.
[7] The light diffusing agent according to any one of items [1] to [6], wherein the structural unit (A) is contained in an amount of 10 to 90% by mass relative to the copolymer, and wherein the structural unit (B) is contained in an amount of 10 to 90% by mass relative to the copolymer.
[8] The light diffusing agent according to any one of items [1] to [7], wherein the copolymer is a polymer microparticle having an average particle diameter of 0.1 to 100 μm.

[9] The light diffusing agent according to any one of items [1] to [8], which contains an inorganic particle in an amount of 0 to 10% by mass relative to the light diffusing agent.

[10] A light diffusing resin composition containing a base resin and the light diffusing agent according to any one of items [1] to [9].

[11] The light diffusing resin composition according to item [10], wherein the base resin is selected from the group consisting of a polycarbonate-based resin, a polyester-based resin and an acrylic resin.

[12] The light diffusing resin composition according to item [10] or [11], wherein the light diffusing agent is contained in an amount of 10 to 100 parts by mass relative to 100 parts by mass of the base resin.

[12-1] The light diffusing resin composition according to any one of items [10] to [12], which contains an inorganic particle in an amount of 0 to 10% by mass relative to 100 parts by mass of the sum of the base resin and the light diffusing agent.

[13] A molded body which is molded by using the light diffusing resin composition according to any one of items [10] to [12].

[14] The molded body according to item [13], which is a plate, sheet or film.

[15] A copolymer which contains:
a (meth)acrylate structural unit (A) represented by general formula (1); and
a polyvalent vinyl structural unit (B) that is copolymerizable with the structural unit (A)

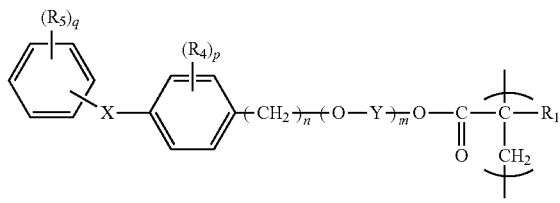

(1)

to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group; or $R_2$ and $R_3$ may be bonded to each other so as to form a cyclic alkyl group having 3 to 10 carbon atoms together with a carbon atom to which they are attached;

Y represents a branched or unbranched alkylene group having 2 to 6 carbon atoms, a cycloalkylene group having 6 to 10 carbon atoms or an arylene group having 6 to 10 carbon atoms;

$R_1$ represents a hydrogen atom or a methyl group;

$R_4$ and $R_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a phenylphenyl group;

m represents an integer of 0 to 10;
n represents an integer of 1 or 2;
p represents an integer of 0 to 4; and
q represents an integer of 0 to 5.

[16] The copolymer according to item [15], wherein m represents an integer of 0 to 3.

[17] The copolymer according to item [15] or [16], wherein X represents a single bond, $-C(R_2)(R_3)-$, $-C(=O)-$, $-O-$, $-SO-$ or $-SO_2-$.

[18] The copolymer according to any one of items [15] to [17], wherein both p and q represent 0.

[19] The copolymer according to any one of items [15] to [18], wherein the structural unit (B) is a divinyl structural unit.

[20] The copolymer according to item [19], wherein the structural unit (B) is a bisphenol-based or naphthyl-based divinyl structural unit.

[20-1] The copolymer according to any one of items [15] to [20], wherein the structural unit (B) comprises a structural unit derived from a compound represented by general formula (2) or a structural unit derived from a compound represented by general formula (3)

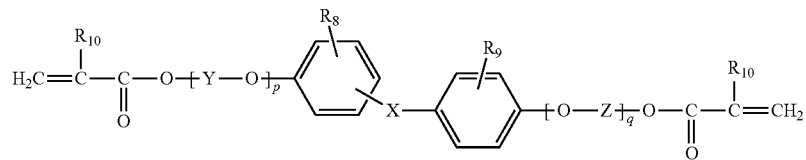

(2)

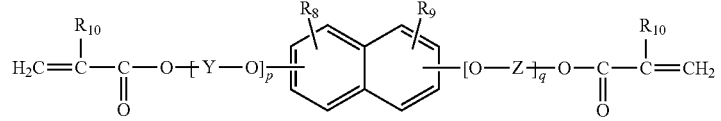

(3)

wherein:

X represents a divalent group selected from the group consisting of a single bond, $-C(R_2)(R_3)-$, $-C(=O)-$, $-O-$, $-OC(=O)-$, $-OC(=O)O-$, $-S-$, $-SO-$, $-SO_2-$ and any combination thereof, wherein $R_2$ and $R_3$ each independently represent a hydrogen atom, a linear alkyl group having 1 to 10 carbon atoms, a branched alkyl group having 3 to 10 carbon atoms, a cyclic alkyl group having 3 wherein:

X represents a divalent group selected from a single bond, $-[C(R_6)(R_7)]_n-$, $-C(=O)-$, $-O-$, $-SO-$ and $-SO-$, wherein $R_6$ and $R_7$ are each independently selected from a hydrogen atom, a methyl group, a phenyl group and a phenylphenyl group; or $R_6$ and $R_7$ are bonded to each other so as to form a cyclic alkyl group having 3 to 13 carbon atoms together with a carbon atom to which they are attached; and n represents an integer of 1 to 10;

$R_8$ and $R_9$ are each independently selected from a hydrogen atom, an alkyl group having 1 to 20 carbon atoms, an alkoxyl group having 1 to 20 carbon atoms, a cycloalkyl group having 3 to 20 carbon atoms, a cycloalkoxyl group having 5 to 20 carbon atoms, an aryl group having 6 to 20 carbon atoms, an aryloxy group having 6 to 20 carbon atoms, and a halogen atom;

$R_{10}$ represents a hydrogen atom or a methyl group;

Y and Z each independently represent a branched or unbranched alkylene group having 2 to 6 carbon atoms, a cycloalkylene group having 6 to 10 carbon atoms or an arylene group having 6 to 10 carbon atoms; and p and q each independently represent an integer of 0 to 4.

[21] The copolymer according to any one of items [15] to [20], wherein the structural unit (A) is contained in an amount of 10 to 90% by mass relative to the copolymer, and wherein the structural unit (B) is contained in an amount of 10 to 90% by mass relative to the copolymer.

[22] The copolymer according to any one of items [15] to [21], which is a polymer microparticle having an average particle diameter of 0.1 to 100 µm.

[23] The copolymer according to any one of items [15] to [22], which contains an inorganic particle in an amount of 0 to 10% by mass relative to the light diffusing agent.

[24] A matting agent for paint, which contains the copolymer according to any one of items [15] to [23].

[25] A paint composition, which contains the matting agent for paint according to item [24].

Advantageous Effect of the Invention

According to the present invention, it is possible to provide a light diffusing agent which makes it possible to obtain a resin molded body having excellent light diffusibility, light transmission properties, surface hardness and the like, a resin composition containing the same, and a molded body.

BEST MODE FOR CARRYING OUT THE INVENTION

Hereinafter, the embodiment of the present invention will be described in detail. Note that all the documents and publications cited herein are incorporated herein by reference in their entireties regardless of purposes thereof. In addition, the contents disclosed in the claims, specification, drawings and abstract of Japanese Patent Application No. 2016-20431 (filed on Feb. 5, 2016), to which priority is claimed by the present application, are incorporated herein by reference in their entireties.

One embodiment of the present invention relates to a copolymer which contains: a (meth)acrylate structural unit (A) represented by general formula (1); and a polyvalent vinyl structural unit (B) that is copolymerizable with the structural unit (A) (hereinafter also referred to as "the (meth)acrylic copolymer"). The (meth)acrylic copolymer of the embodiment is used, for example, as a light diffusing agent.

1. Light Diffusing Agent

The light diffusing agent of the present invention contains the (meth)acrylic copolymer that contains: the (meth)acrylate structural unit (A) represented by general formula (1); and the polyvalent vinyl structural unit (B) that is copolymerizable with the structural unit (A).

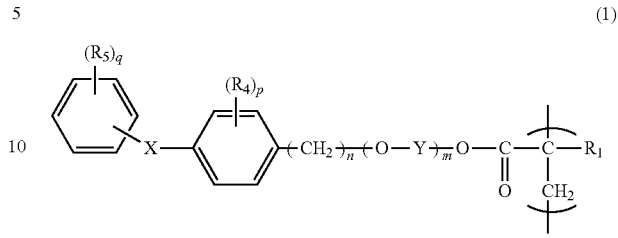

(1)

A resin molded body, which has a constitution in which the light diffusing agent of the present invention is dispersed in a base resin, has excellent light diffusibility and light transmission properties. It is not known exactly why the light diffusing agent of the present invention can impart the above-described optical characteristics to the resin molded body, but it is inferred as follows: the light diffusing agent of the present invention has the aforementioned (meth) acrylate structural unit (A) represented by general formula (1) and therefore has excellent dispersibility in various resins typified by an acrylic resin, an aromatic polycarbonate resin and a polyester resin which are generally used as base resins, and it is considered that for this reason, both light diffusibility and light transmission properties can be possessed.

The light diffusing agent of the present invention has excellent dispersibility in the base resin and therefore can exist in the base resin in a uniformly dispersed state. It is considered that such excellent dispersibility contributes to the above-described optical characteristics.

In addition, the light diffusing agent of the present invention can have the (meth)acrylate structural unit as the main component and therefore can impart surface hardness to a resin molded body. Since a resin molded body having excellent surface hardness can be used without providing a hard coat layer to the surface thereof, steps for forming a hard coat layer can be reduced, and moreover, it is economical.

Thus, a resin molded body containing the light diffusing agent of the present invention has the above-described excellent characteristics, and therefore can be widely used in applications requiring these characteristics, for example, covers of lighting equipments, backlights in display devices of personal computers, televisions, etc., automobile meters, signboards, etc.

Hereinafter, respective components contained in the light diffusing agent will be described in order.

[1] (Meth)acrylic Copolymer

The (meth)acrylic copolymer, which is the major component of the light diffusing agent, contains: the (meth)acrylate structural unit (A) represented by general formula (1); and the polyvalent vinyl structural unit (B) that is copolymerizable with the structural unit (A).

(1) (Meth)acrylate Structural Unit (A)

The (meth)acrylate structural unit (A) has a structure represented by general formula (1) below. In this specification, an acrylate structural unit and a methacrylate structural unit are collectively referred to as "the (meth)acrylate structural unit".

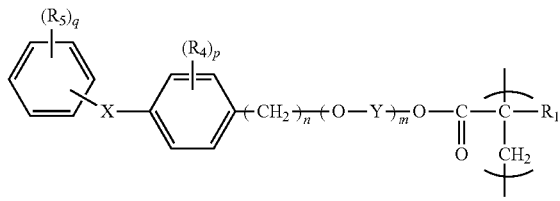

(1)

The (meth)acrylate structural unit (A) represented by general formula (1) has structural characteristics that an ester moiety thereof has 2 or more benzene rings and that an oxygen atom and the benzene rings of the ester moiety are not directly bonded to each other.

In general formula (1) above, $R_1$ is a hydrogen atom or a methyl group, and preferably a methyl group.

X represents a divalent group selected from the group consisting of a single bond, —C($R_2$)($R_3$)—, —C(=O)—, —O—, —OC(=O)—, —OC(=O)O—, —S—, —SO—, —SO$_2$— and any combination thereof, and $R_2$ and $R_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group. These may have a substituent, and examples of the substituent include a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms and a halogen atom.

X is preferably a single bond, —C($R_2$)($R_3$)—, —C(=O)—, —O—, —SO— or —SO$_2$—, more preferably a single bond, —C($R_2$)($R_3$)—, —O— or —SO$_2$—, and particularly preferably a single bond, a methylene group or —O—. $R_2$ and $R_3$ are preferably each independently selected from a hydrogen atom, a methyl group, a methoxy group, a phenyl group and a phenylphenyl group, and more preferably a hydrogen atom.

$R_2$ and $R_3$ may be bonded to each other so as to form a cyclic alkyl group having 3 to 10 carbon atoms together with a carbon atom to which they are attached.

Y represents a branched or unbranched alkylene group having 2 to 6 carbon atoms, a cycloalkylene group having 6 to 10 carbon atoms or an arylene group having 6 to 10 carbon atoms. Among them, an alkylene group having 2 to 6 carbon atoms is preferred, ethylene or propylene is more preferred, and ethylene is particularly preferred.

$R_4$ and $R_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a phenylphenyl group. These may have a substituent, and examples of the substituent include a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms and a halogen atom.

$R_4$ and $R_5$ are preferably each independently selected from a methyl group, a methoxy group, a chloro group, a bromo group and a phenyl group, and more preferably a phenyl group.

m is an integer of 0 to 10, preferably an integer of 0 to 3, and more preferably 0.

n is an integer of 1 or 2, and preferably 1.

p is an integer of 0 to 4, preferably an integer of 0 to 1, and more preferably 0.

q is an integer of 0 to 5, preferably an integer of 0 to 2, and more preferably 0.

Examples of the (meth)acrylate compound represented by general formula (1) above include 4-phenylbenzyl(meth)acrylate, 3-phenylbenzyl(meth)acrylate, 2-phenylbenzyl(meth)acrylate, 4-biphenylbenzyl(meth)acrylate, 3-biphenylbenzyl(meth)acrylate, 2-biphenylbenzyl(meth)acrylate, 4-benzylbenzyl(meth)acrylate, 3-benzylbenzyl(meth)acrylate, 2-benzylbenzyl(meth)acrylate, 4-phenethylbenzyl(meth)acrylate, 3-phenethylbenzyl(meth)acrylate, 2-phenethylbenzyl(meth)acrylate, 4-phenethylphenethyl(meth)acrylate, 3-phenethylphenethyl(meth)acrylate, 2-phenethylphenethyl(meth)acrylate, 4-(4-methylphenyl)benzyl(meth)acrylate, 3-(4-methylphenyl)benzyl(meth)acrylate, 2-(4-methylphenyl)benzyl(meth)acrylate, 4-(4-methoxyphenyl)benzyl(meth)acrylate, 3-(4-methoxyphenyl)benzyl(meth)acrylate, 2-(4-methoxyphenyl)benzyl(meth)acrylate, 4-(4-bromophenyl)benzyl(meth)acrylate, 3-(4-bromophenyl)benzyl(meth)acrylate, 2-(4-bromophenyl)benzyl(meth)acrylate, 4-benzoylbenzyl(meth)acrylate, 3-benzoylbenzyl(meth)acrylate, 2-benzoylbenzyl(meth)acrylate, 4-(phenylsulfinyl)benzyl(meth)acrylate, 3-(phenylsulfinyl)benzyl(meth)acrylate, 2-(phenylsulfinyl)benzyl(meth)acrylate, 4-(phenylsulfonyl)benzyl(meth)acrylate, 3-(phenylsulfonyl)benzyl(meth)acrylate, 2-(phenylsulfonyl)benzyl(meth)acrylate, 4-((phenoxylcarbonyl)oxy)benzyl(meth)acrylate, 3-((phenoxycarbonyl)oxy)benzyl(meth)acrylate, 2-((phenoxycarbonyl)oxy)benzyl(meth)acrylate, 4-(((meth)acryloxy)methyl)phenyl benzoate, 3-(((meth)acryloxy)methyl)phenyl benzoate, 2-(((meth)acryloxy)methyl)phenyl benzoate, phenyl 4-(((meth)acryloxy)methyl)benzoate, phenyl 3-(((meth)acryloxy)methyl)benzoate, phenyl 2-(((meth)acryloxy)methyl)benzoate, 4-(1-phenylcyclohexyl)benzyl(meth)acrylate, 3-(1-phenylcyclohexyl)benzyl(meth)acrylate, 2-(1-phenylcyclohexyl)benzyl(meth)acrylate, 4-phenoxybenzyl(meth)acrylate, 3-phenoxybenzyl(meth)acrylate, 2-phenoxybenzyl(meth)acrylate, 4-(phenylthio)benzyl(meth)acrylate, 3-(phenylthio)benzyl(meth)acrylate, 2-(phenylthio)benzyl(meth)acrylate and 3-methyl-4-(2-methylphenyl)benzylmethacrylate. These compounds may be used solely, or two or more of them may be used in combination. Among them, preferred are 4-phenylbenzyl(meth)acrylate, 3-phenylbenzyl(meth)acrylate, 2-phenylbenzyl(meth)acrylate, 4-biphenylbenzyl(meth)acrylate, 3-biphenylbenzyl(meth)acrylate and 2-biphenylbenzyl(meth)acrylate, and more preferred are 4-phenylbenzyl(meth)acrylate, 3-phenylbenzyl(meth)acrylate, 2-phenylbenzyl(meth)acrylate, 4-benzylbenzyl(meth)acrylate, 4-phenoxybenzyl(meth)acrylate and 4-(phenylsulfonyl)benzyl(meth)acrylate.

(2) Polyvalent Vinyl Structural Unit (B)

In this specification, a "polyvalent vinyl structural unit" means a structural unit derived from a polyfunctional (meth)acrylate having 2 or more polymerizable vinyl groups which is copolymerizable with the structural unit (A). The number of the polymerizable vinyl group in a polyfunctional acrylate monomer is preferably 2 to 6, more preferably 2 to 4, and particularly preferably 2. Accordingly, the polyvalent vinyl structural unit (B) is particularly preferably a divinyl structural unit. As the polyvalent vinyl structural unit (B), only one type of a structural unit may be used, or two or more types of structural units may be used in combination.

As the polyvalent vinyl structural unit (B), it is possible to use any structural unit derived from a polyfunctional acrylate having 2 or more polymerizable vinyl groups which is copolymerizable with the structural unit (A), but in order to improve light diffusibility of molded bodies, it is preferred to use a structural unit having a high refractive index. Specifically, bisphenol-based, biphenyl-based and naphthyl-based polyvalent vinyl structural units are preferred, a bisphenol-based polyvalent vinyl structural unit is preferred, and a bisphenol-based polyvalent vinyl structural unit is more preferred. In this regard, the bisphenol-based polyvalent vinyl structural unit means a structural unit derived from a compound having a bisphenol skeleton and 2 or more vinyl groups. The biphenyl-based polyvalent vinyl structural unit means a structural unit derived from a compound having a biphenyl skeleton and 2 or more vinyl groups. The naphthyl-based polyvalent vinyl structural unit means a structural unit derived from a compound having a naphthyl skeleton and 2 or more vinyl groups.

The polyvalent vinyl structural unit (B) is particularly preferably a bisphenol-based divinyl structural unit or a naphthyl-based divinyl structural unit.

Examples of the bisphenol-based divinyl structural unit include a structural unit derived from a compound represented by general formula (2), and examples of the naphthyl-based divinyl structural unit include a structural unit derived from a compound represented by general formula (3).

group having 1 to 20 carbon atoms, an alkoxyl group having 1 to 20 carbon atoms, a cycloalkyl group having 3 to 20 carbon atoms, a cycloalkoxyl group having 5 to 20 carbon atoms, an aryl group having 6 to 20 carbon atoms, an aryloxy group having 6 to 20 carbon atoms and a halogen atom. Among them, a hydrogen atom, an alkyl group having 1 to 10 carbon atoms, a cycloalkyl group having 5 to 20 carbon atoms and an aryl group having 6 to 15 carbon atoms are preferred, a hydrogen atom, a methyl group, an ethyl group, a propyl group, a butyl group, a cyclohexyl group and a phenyl group are more preferred, and a hydrogen atom, a methyl group and a phenyl group are particularly preferred. Further, $R_8$ and $R_9$ may be bonded to each other so as to form a ring together with a carbon atom to which they are attached.

In general formulae (2) and (3) above, Y and Z each independently represent a branched or unbranched alkylene group having 2 to 6 carbon atoms, a cycloalkylene group having 6 to 10 carbon atoms or an arylene group having 6 to 10 carbon atoms. Among them, an alkylene group having 2 to 6 carbon atoms is preferred, ethylene or propylene is more preferred, and ethylene is particularly preferred.

In general formulae (2) and (3) above, $R_{10}$ represents a hydrogen atom or a methyl group, and preferably a methyl group.

p and q each independently represent an integer of 0 to 4, preferably from 0 to 2, and more preferably 0 or 1. It is even more preferred that both p and q are 0 or 1, and it is particularly preferred that both p and q are 1.

Specific examples of compounds represented by formulae (2) and (3) include 9,9'-bis [4-(2-(meth)acryloyloxyethoxy)phenyl]fluorene, 4,4'-isopropylidene diphenol di(meth)acrylate, 2,2'-bis[4-(2-(meth)acryloyloxyethoxy)phenyl]propane, bis[4-(2-(meth)acryloyloxyethoxy)phenyl]methane,

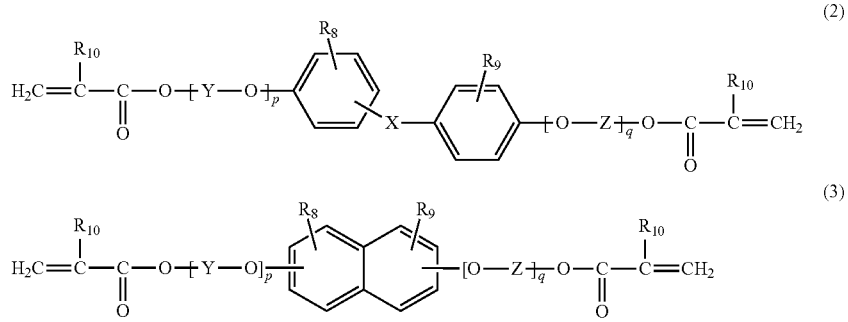

In general formula (2), X is preferably a single bond, —[C($R_6$)($R_7$)]$_n$—, —C(=O)—, —O—, —SO— or —SO$_2$—, more preferably a single bond, —[C($R_6$)($R_7$)]$_n$—, —O— or —SO$_2$—, and particularly preferably a single bond or —[C($R_6$)($R_7$)]$_n$—. $R_6$ and $R_7$ are preferably each independently selected from a hydrogen atom, a methyl group, a phenyl group and a phenylphenyl group, and more preferably a methyl group.

$R_6$ and $R_7$ may be bonded to each other so as to form a cyclic alkyl group having 3 to 13 carbon atoms together with a carbon atom to which they are attached. For example, X may be a divalent fluorene.

n is preferably from 1 to 10, more preferably from 1 to 6, even more preferably from 1 to 4, and particularly preferably 1.

In general formulae (2) and (3), $R_8$ and $R_9$ are each independently selected from a hydrogen atom, an alkyl 1,1'-bis[4-(2-(meth)acryloyloxyethoxy)phenyl]methane, bis[4-(2-(meth)acryloyloxyethoxy)phenyl]ether, bis[4-(2-(meth)acryloyloxyethoxy)phenyl]sulfoxide, bis[4-(2-(meth)acryloyloxyethoxy)phenyl]sulfide, bis(4-(2-(meth) acryloyloxyethoxy)phenyl]sulfone, bis(4-(2-(meth) acryloyloxyethoxy)phenyl]ketone, 4,4'-di(meth)acryloyloxy biphenyl and 2,6-di(meth)acryloyloxy naphthalene. Among them, 9,9'-bis [4-(2-(meth)acryloyloxyethoxy)phenyl]fluorene, 4,4'-isopropylidene diphenol di(meth)acrylate and 2,2'-bis[4-(2-(meth)acryloyloxyethoxy)phenyl]propane are preferred, and 9,9'-bis[4-(2-(meth)acryloyloxyethoxy)phenyl] fluorene is more preferred.

(3) (Meth)acrylic Copolymer

In the (meth)acrylic copolymer obtained by polymerizing the (meth)acrylate structural unit (A) and the polyvalent vinyl structural unit (B), the ratio between the structural unit (A) and the structural unit (B) is not particularly limited, but it is preferred that the structural unit (A) is contained in an amount of 10 to 90% by mass relative to the copolymer and that the structural unit (B) is contained in an amount of 10 to 90% by mass relative to the copolymer. When the structural unit (A) is in an amount of 10% by mass or more, the copolymer has a high refractive index and good dispersibility with the base resin. When (B) is in an amount of 10% by mass or more, crosslinking is sufficiently progressed and a copolymer insoluble in a solvent can be obtained.

It is more preferred that the structural unit (A) is contained in an amount of 20 to 90% by mass relative to the (meth)acrylic copolymer and that the structural unit (B) is contained in an amount of 10 to 80% by mass relative to the (meth)acrylic copolymer. Further, it is particularly preferred that the structural unit (A) is contained in an amount of 40 to 90% by mass relative to the (meth)acrylic copolymer and that the structural unit (B) is contained in an amount of 10 to 60% by mass relative to the (meth)acrylic copolymer.

The (meth)acrylic copolymer may contain structural units other than the structural units (A) and (B) according to need. Such other structural units are not particularly limited as long as they do not have adverse effect on the properties of the copolymer. Examples thereof include structural units derived from: methacrylates such as ethyl methacrylate, butyl methacrylate, propyl methacrylate and 2-ethylhexyl methacrylate; acrylates such as ethyl acrylate, butyl acrylate, propyl acrylate, 2-ethylhexyl acrylate and glycidyl acrylate; vinyl cyanide monomers such as acrylonitrile and methacrylonitrile; dienic monomers such as butadiene, isoprene and dimethyl butadiene; vinyl ether-based monomers such as vinyl methyl ether and vinyl ethyl ether; carboxylic-acid-based vinyl monomers such as vinyl acetate and vinyl butylate; olefinic monomers such as ethylene, propylene and isobutylene; ethylenic unsaturated carboxylic acid monomers such as acrylic acid, methacrylic acid, maleic acid and itaconic acid; halogenated vinyl monomers such as vinyl chloride and vinylidene chloride; maleimide-based monomers such as maleimide, N-phenylmaleimide, N-cyclohexylmaleimide and N-methylmaleimide; and crosslinking agents such as allyl (meth)acrylate, divinylbenzene and 1,3-buthylenedimethacrylate. Among them, structural units derived from methacrylates, acrylates and vinyl cyanide monomers are preferred, and from the viewpoint of suppressing thermal decomposition of the copolymer, structural units derived from acrylates are more preferred. These structural units may be used solely, or two or more of them may be used in combination.

When the other structural units are contained, they are contained in an amount of preferably 0.1 to 10% by mass, more preferably 0.1 to 5% by mass, and particularly preferably 0.1 to 3% by mass relative to the copolymer. When the content of the other structural units is 0.1% by mass or more, thermal decomposition of the copolymer can be suppressed, and when the content is 10% by mass or less, the characteristics as the light diffusing agent are not affected thereby.

The polymerization method for obtaining the (meth)acrylic copolymer is not particularly limited and a publicly-known method such as emulsion polymerization, suspension polymerization, solution polymerization and block polymerization may be employed. Suspension polymerization and block polymerization are preferable while suspension polymerization is more preferable. Moreover, additives and the like which are required for polymerization can be suitably added according to need. Examples of such additives include, but are not limited to, a suspension stabilizer, a surfactant, a polymerization initiator, an emulsifier, a dispersant and a chain transfer agent. As these additives, substances which are usually used in the production of the (meth)acrylic copolymer can be used.

The polymerization temperature is preferably 50° C. to 150° C., and more preferably 70° C. to 130° C., which may vary depending on the structure and mass ratio of each of the structural units (A) and (B) and the types of the additives such as the polymerization initiator. The polymerization may be carried out by increasing the temperature in a multi-step manner.

Although the polymerization time may vary depending on the polymerization method, the structure and mass ratio of each of the structural units (A) and (B) and the types of the additives such as the polymerization initiator, it is preferably 1 to 8 hours, and more preferably 2 to 6 hours at the intended temperature. To this polymerization time, the time that takes to reach the intended temperature should further be added.

The polymerization reaction may be performed under ordinary pressure or elevated pressure. Although the reaction pressure may vary depending on the polymerization method, the structure and mass ratio of each of the structural units (A) and (B) and the like, the polymerization is carried out preferably at a reaction pressure of 0 MPa (ordinary pressure) to 3 MPa, and more preferably at a reaction pressure of 0 MPa (ordinary pressure) to 1 MPa.

According to one embodiment of the present invention, provided is a copolymer, which contains: a (meth)acrylate structural unit (A) represented by general formula (1); and a polyvalent vinyl structural unit (B) that is copolymerizable with the structural unit (A)

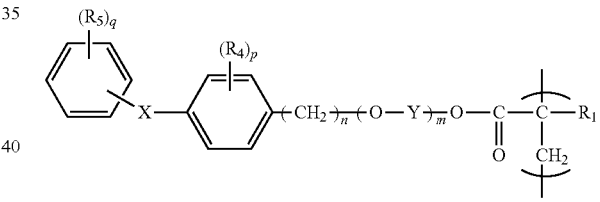

(1)

wherein:

X represents a divalent group selected from the group consisting of a single bond, —C(R$_2$)(R$_3$)—, —C(=O)—, —O—, —OC(=O)—, —OC(=O)O—, —S—, —SO—, —SO$_2$— and any combination thereof, wherein R$_2$ and R$_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group; or R$_2$ and R$_3$ may be bonded to each other so as to form a cyclic alkyl group having 3 to 10 carbon atoms together with a carbon atom to which they are attached;

Y represents a branched or unbranched alkylene group having 2 to 6 carbon atoms, a cycloalkylene group having 6 to 10 carbon atoms or an arylene group having 6 to 10 carbon atoms;

R$_1$ represents a hydrogen atom or a methyl group;

R$_4$ and R$_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a phenylphenyl group;

m represents an integer of 0 to 10;
n represents an integer of 1 or 2;
p represents an integer of 0 to 4; and
q represents an integer of 0 to 5.

[2] Characteristics of Light Diffusing Agent

The (meth)acrylic copolymer obtained by the above-described method is a bead-like polymer microparticle and can be directly used as the light diffusing agent. According to one embodiment, the light diffusing agent contains the above-described (meth)acrylic copolymer in an amount of 50% by mass or more (more preferably 70% by mass or more, even more preferably 80% by mass or more, still more preferably 90% by mass or more, and particularly preferably 95% by mass or more) relative to 100% by mass of the light diffusing agent. Alternatively, the surface of the obtained bead-like polymer particle may be coated by means of coating, metal deposition or the like to be used as the light diffusing agent.

Examples of components other than the above-described (meth)acrylic copolymer contained in the light diffusing agent include the above-described additives that may be added at the time of polymerization (e.g., a suspension stabilizer, a surfactant, a polymerization initiator, an emulsifier, a dispersant and a chain transfer agent), and surface coating agents for inorganic particles and particles of the light diffusing agent (metals, etc.).

The average particle diameter of the light diffusing agent is preferably 0.1 to 100 μm, more preferably 0.5 to 50 μm, even more preferably 1 to 30 μm, particularly preferably 10 to 30 μm, and most preferably 15 to 25 μm. In this regard, the average particle diameter means a volume-average particle diameter, and the method for calculation thereof is as described in the Examples.

When the average particle diameter is within the above-described range, sufficient light diffusibility can be imparted to resin molded bodies, and light diffusion effects commensurate with an adding amount of the light diffusing agent can be obtained. The average particle diameter can be controlled, for example, by adjusting the adding amount of the suspension stabilizer. In general, there is a tendency that the larger the adding amount of the suspension stabilizer is, the smaller the particle diameter is.

In addition to the (meth)acrylic copolymer of the embodiment, an inorganic particle may be blended in the light diffusing agent. However, in general, inorganic particles such as particles of metal oxides which are conventionally used as a light diffusing agent have a tendency that a problem that light transmission properties are reduced because light which enters into a light diffusing sheet containing a light diffusing agent is reflected and a problem that the strength of a light diffusing sheet is reduced are caused by a large difference between the refractive index of such particles and that of a base resin and a large surface area of such particles. Accordingly, from the viewpoint of achieving a balance between light diffusibility, light transmission properties and mechanical strength, the content of the inorganic particle is preferably 0 to 10% by mass, more preferably 0 to 5% by mass, and even more preferably 0 to 1% by mass relative to the aforementioned light diffusing agent (100% by mass). Particularly preferably, the inorganic particle is not contained in the light diffusing agent (0% by mass).

The inorganic particle is not particularly limited, and examples thereof include particles of inorganic oxides such as zirconium oxide ($ZrO_2$), titanium oxide ($TiO_2$), silicon dioxide and aluminium oxide (preferably nanoparticles of inorganic oxides).

The light diffusing agent of the present invention can exert excellent light diffusibility even when the inorganic particle is not contained therein.

The light diffusing agent preferably has a small content of a polymer particle containing sulfur atoms (sulfur-containing particle) in view of the problem of odor and weatherability. The content of the sulfur-containing particle is preferably 0 to 10% by mass, more preferably 0 to 5% by mass, and even more preferably 0 to 1% by mass relative to the aforementioned light diffusing agent (100% by mass). Particularly preferably, the sulfur-containing particle is not contained in the light diffusing agent (0% by mass).

The light diffusing agent of the present invention preferably has a high refractive index from the viewpoint of light diffusibility. Specifically, the refractive index is preferably 1.58 or higher, more preferably 1.59 or higher, and even more preferably 1.6 or higher. Further, the refractive index of the light diffusing agent is preferably higher than the refractive index of the base resin in which the light diffusing agent is dispersed. This is because light emitted to the front direction can increase, thereby improving luminance. Meanwhile, even if the light diffusing agent of the present invention has a refractive index lower than that of the base resin, since the light diffusing agent of the present invention has a relatively high refractive index, the difference between the refractive index of the light diffusing agent and that of the base resin can be set within an appropriate range as described below. For this reason, the light diffusing agent of the present invention can be used even in the base resin having a relatively high refractive index without any problem.

As described above, it is preferred that the difference between the refractive index of the light diffusing agent and that of the base resin is small. Specifically, the difference in the refractive index is preferably 0.005 to 0.1, and more preferably 0.01 to 0.05. When the difference in the refractive index is within the above-described range, sufficient light diffusibility can be obtained, and light emitted to the front direction can be sufficiently obtained, thereby obtaining excellent luminance.

In this regard, the refractive index means a refractive index at a measurement wavelength of 589 nm and a measurement temperature of 23° C.

Note that as the light diffusing agent of the present invention, one type of a material may be used solely, or two or more types of materials may be used in any combination at any ratio.

2. Light Diffusing Resin Composition

According to one embodiment of the present invention, a light diffusing resin composition containing a base resin and the above-described light diffusing agent is provided. As described above, as the base resin, it is preferred to use a base resin, which has a refractive index lower than that of the light diffusing agent, and wherein the difference between the refractive index of the base resin and that of the light diffusing agent is small. Specific examples thereof include a polycarbonate-based resin, a polyester-based resin and an acrylic resin. Among them, a polycarbonate-based resin, a polyester-based resin and an acrylic resin are preferred, and a polycarbonate-based resin and a polyester-based resin are more preferred.

The content of the light diffusing agent in the light diffusing resin composition is preferably 10 to 100 parts by mass, more preferably 15 to 80 parts by mass, and particularly preferably 20 to 75 parts by mass relative to 100 parts by mass of the base resin. When the content of the light diffusing agent is 10 parts by mass or more relative to 100 parts by mass of the base resin, a molded body of the light diffusing resin composition has sufficient light diffusibility and a light source can be hidden. Meanwhile, when the content of the light diffusing agent is 100 parts by mass or less, it is possible to prevent reduction in light transmission properties due to a too much amount of the light diffusing agent, and it is also possible to prevent reduction in luminance in the case of use in a lighting equipment or the like.

According to a specific embodiment, the light diffusing resin composition contains the light diffusing agent in an amount of 55 to 75 parts by mass relative to 100 parts by mass of the base resin. Since the light diffusing agent of the present invention has excellent dispersibility in the base resin, it is possible to employ a large blending ratio of the light diffusing agent relative to the base resin. According the embodiment, it is possible to obtain a molded body having particularly excellent light diffusibility and hardness while light transmission properties are maintained.

The light diffusing resin composition may contain other components other than the base resin and the light diffusing agent. Examples of the other components include a resin and an additive. Examples of the resin that may be added include: polystyrene-based resins such as ABS, HIPS, PS and PAS; polyester-based resins such as polyethylene terephthalate and polybutylene terephthalate; polyolefin-based resins; and polymer alloys such as elastomers that are blended with other thermoplastic resins. The content of such resin is preferably within a range that does not impair the optical properties of the light diffusing resin composition and the physical properties such as heat resistance, impact resistance and flame retardance that are inherent in the base resin. Specifically, the content is preferably 50 parts by mass or less relative to 100 parts by mass of the sum of the base resin and the light diffusing agent.

Further, examples of the additive that may be contained in the above-described resin composition include a stabilizer, a strengthening agent, a weather proofing agent, an inorganic filler, an impact resistance modifying agent, a flame retardant, an antistatic agent, a mold release agent, a pigment and fluoroolefin. Specifically, talc, mica, calcium carbonate, glass fiber, carbon fiber, potassium titanate fiber or the like may be used in order to improve the strength, stiffness, flame retardance or the like of the molded body. In addition, a polyester-based resin such as polyethylene terephthalate, which is for improving chemical resistance or the like, and a rubber-like elastic body having a bilayer core-shell structure or the like, which is for improving impact resistance, may also be contained.

Examples of the above-described stabilizer include triphenyl phosphite, tris(nonylphenyl)phosphite, distearylpentaerythritol diphosphite, diphenylhydrogen phosphite, and stearyl-β-(3,5-di-tert-butyl-4-hydroxyphenyl)propionate (trade name "IRGANOX 1076", manufactured by Ciba Japan K.K.). Examples of the above-described weather proofing agent include 2-(2'-hydroxy-5'-methylphenyl)benzotriazole, 2-(2'-hydroxy-3',5'-di-tert-amylphenyObenzotriazole, 2-(2'-hydroxy-4'-octoxyphenyl)benzotriazole and 2-hydroxy-4-octoxybenzophenone.

As the additive, an inorganic particle may be blended in the light diffusing resin composition, but from the viewpoint of uniform dispersibility, the content of the inorganic particle is preferably 0 to 10 parts by mass, more preferably 0 to 5 parts by mass, and even more preferably 0 to 1 parts by mass relative to 100 parts by mass of the sum of the base resin and the light diffusing agent. Particularly preferably, the inorganic particle is not contained in the light diffusing resin composition (0 part by mass).

The inorganic particle is not particularly limited, and examples thereof include particles of inorganic oxides such as zirconium oxide ($ZrO_2$) and titanium oxide ($TiO_2$) (preferably nanoparticles of inorganic oxides).

As the method for producing the light diffusing resin composition, any method can be used as long as the light diffusing agent can be dispersed in the base resin. When the light diffusing agent has compatibility with the base resin, the light diffusing agent can be directly added to the base resin. Alternatively, the base resin and the light diffusing agent may be dissolved in any solvent to obtain a solution. It is also possible to dissolve the light diffusing agent in any solvent, followed by adding the resultant solution to the base resin. Further, the base resin and the light diffusing agent may be mixed together and pelletized using a pelletizer to obtain a pellet of the resin composition.

3. Molded Body

According to one embodiment of the present invention, a molded body molded by using the light diffusing resin composition is provided. The shape, pattern, color, size, etc. of the molded body are not limited, and can be determined according to the intended use thereof. For example, the molded body may be in the form of a sheet, film, plate or the like. For example, the molded body of the embodiment is an optical member for a cover of lighting equipment, a light diffusion plate of a liquid crystal display device, etc.

The total light transmittance of the molded body is preferably 80% or more, more preferably 90% or more, for example, 90 to 95%, or 90 to 93%. Further, the haze that is an index of light diffusibility is preferably 80% or more, for example, 80 to 90%, or 80 to 85%. When both the total light transmittance and the haze are within the above-described ranges, a molded body excellent in light transmission properties and light diffusibility with a good balance between them is obtained. Further, the pencil hardness of the molded body is preferably HB or harder, and more preferably F or harder.

The method for molding the molded body is not particularly limited, and a generally-used method can be used. Examples thereof include compression molding, transfer molding, injection molding, blow molding, extrusion molding, lamination molding, calender molding and cast molding.

4. Matting Agent

The light diffusing agent of the embodiment can impart matte effect to the surface of a coating film when being blended in a paint, ink or the like, and therefore can be used as a matting agent for paint. Specifically, one embodiment of the present invention provides a matting agent for paint containing the above-described (meth)acrylic copolymer. When a coating film is formed by using a paint composition containing the matting agent of the embodiment, a coating film surface having excellent design property including texture, wherein glossiness is suppressed, can be obtained. Further, when matte finish is applied to the surface of automobile interior equipment, safety can be improved by reduction in reflected light.

In the present invention, the particle of the light diffusing agent of the embodiment explained above can be directly used as the matting agent for paint. The paint composition of the embodiment may contain the matting agent for paint of the present invention, a binder resin, and according to need, a solvent, and publicly-known additives such as an ultraviolet absorber, a light stabilizer, an antioxidant, an antistatic agent, a storage stabilizer, a plasticizer, a lubricant and a filler. The blending amount of the matting agent for paint in the paint composition may be suitably set depending on the type of paint and desired degree of matting. For example, the blending amount of the matting agent for paint of the present invention is 0.1 to 200 parts by mass (for example, 0.5 to 100 parts by mass or 0.5 to 50 parts by mass) relative to 100 parts by mass of the binder resin.

As the binder resin for paint, a publicly-known resin can be suitably selected. Examples thereof include an acrylic resin, polyester, a urethane resin, an epoxy resin, polyolefin, a silicon-based resin, a fluorine-based resin and a nitrocellulose resin, which are generally soluble in an organic solvent. Examples thereof also include water-soluble forms, suspensions and emulsions of the aforementioned resins. The binder resin for paint is usually used after being diluted with an organic solvent or water.

Examples of the method for preparing the paint composition include a method of mixing the matting agent for paint, the binder resin, and according to need, a solvent, additives, etc. by using a stirring machine, kneader, mixer or the like.

The blended paint composition is applied to a substrate and dried, thereby obtaining a coating film. Examples of the applying method include spray coating, roll coating and brush coating.

The matting agent of the present invention is suitably used for forming an optical material, a matting paint for the surface of electrical appliances such as home electronics, or a paint to be used for building materials, the exterior of automobiles, automobile interior equipments, etc.

EXAMPLES

Hereinafter, the present invention will be described in detail with reference to examples, but the technical scope of the present invention should not be limited thereto. In the examples, "parts" and "%" mean "parts by mass" and "% by mass", respectively.

Further, the respective physical properties in Examples and Comparative Examples were measured by the below-described methods.

1. Volume-Average Particle Diameter

Methanol was added to each of the (meth)acrylic copolymers produced in the below-described Production Examples to be homogeneously diffused while adjusting the resin concentration to 5% by mass. After that, the particle size distribution was measured using a laser diffraction/scattering type particle size distribution measuring device (Laser Micron Sizer LMS-300 manufactured by Seishin Enterprise Co., Ltd.). The volume-average particle diameter was calculated based on the obtained particle size distribution.

Specifically, regarding particles with particle diameters d1, d2, ..., di, ... and dk in order from smallest to largest, when the volume per particle is Vi, the volume-average particle diameter (MV) is calculated according to the below-described formula.

$$MV = \frac{V1 \cdot d1 + V2 \cdot d2 + \ldots Vi \cdot di + \ldots Vk \cdot dk}{V1 + V2 + \ldots Vi + \ldots Vk} = \frac{\Sigma(Vi \cdot di)}{\Sigma(Vi)} = \frac{\Sigma(Vi \cdot di)}{100}$$

2. Refractive Index 1 part by mass of 2,2-azobis-2,4-dimethylvaleronitrile (initiator) was dissolved in 100 parts by mass of a mixture of a monomer having the same composition as the materials used in the production of the below-described (meth)acrylic copolymers a to e. The resultant mixture was injected into a glass mold having a width of 50 mm, a length of 100 mm and a thickness of 1 mm. After that, it was polymerized at 40° C. for 10 hours, and subsequently polymerized while increasing the temperature from 40° C. to 80° C. over 5 hours and further polymerized at 100° C. for 1 hour. The obtained polymer was cooled and then released from the glass mold, thereby obtaining a test piece for the measurement of the refractive index. The measurement was carried out using a multi-wavelength Abbe refractometer DR-M2 (manufactured by Atago Co., Ltd.). Regarding measurement conditions, the measurement wavelength was 589 nm and the measurement temperature was 23° C.

3. Pencil Hardness

The pencil hardness with which no scratch was observed on the surface of a light diffusion plate prepared in the Examples was measured according to JIS K5600-5-4.

4. Total Light Transmittance, Haze

The total light transmittance and haze of a light diffusion plate prepared in the Examples were measured using Haze meter NDH4000 (manufactured by Nippon Denshoku Industries Co., Ltd.) according to JIS K 7136.

Note that in the measurement, light was entered from the surface of the light diffusion plate to which a resin solution was applied.

Production Example 1

Synthesis of (meth)acrylic Copolymer a 200 parts by mass of deionized water, 2.0 parts by mass of tricalcium phosphate (suspension stabilizer), 0.1 parts by mass of sodium lauryl sulfate (suspension stabilizing aid) and 0.01 parts by mass of sodium dodecylbenzene sulfonate (surfactant) were put into a heatable round-bottom separable flask equipped with a stirring device, and then the mixture was stirred. Concurrently, 60 parts by mass of 4-phenylbenzylmethacrylate and 40 parts by mass of 9,9'-bis[4-(2-acryloyloxyethoxy)phenyl]fluorene as monomers; 0.5 parts by mass of 2,2-azobis-2,4-dimethylvaleronitrile (initiator); and 0.5 parts by mass of normal-octylmercaptan (nOM) (chain transfer agent) were mixed together to prepare a homogeneous monomer solution, which was put into the reactor. The inside of the reactor was subjected to substitution with nitrogen, and then a reaction was carried out at 75° C. for 2 hours followed by 90° C. for 2 hours to complete the polymerization reaction. The resulting bead-like polymer was washed with water and then dried to obtain a (meth) acrylic copolymer a.

Production Example 2

Synthesis of (meth)acrylic Copolymer b 200 parts by mass of deionized water, 2.0 parts by mass of tricalcium phosphate (suspension stabilizer), 0.1 parts by mass of sodium lauryl sulfate (suspension stabilizing aid) and 0.01 parts by mass of sodium dodecylbenzene sulfonate (surfactant) were put into a heatable high-pressure reactor equipped with a stirring device, and then the mixture was stirred. Concurrently, 60 parts by mass of 4-phenylbenzylmethacrylate and 40 parts by mass of 9,9'-bis[4-(2-acryloyloxyethoxy)phenyl]fluorene as monomers; 0.3 parts by mass of Perbutyl E (manufactured by NOF Corporation) (initiator); and 0.5 parts by mass of normal-octylmercaptan (nOM) (chain transfer agent) were mixed together to prepare a homogeneous monomer solution, which was put into the reactor. The reactor was filled with nitrogen to increase the pressure from 0 MPa (ordinary pressure) to 0.1 MPa. A reaction was carried out at 110° C. for an hour followed by 120° C. for 2 hours to complete the polymerization reaction. The resulting bead-like polymer was washed with water and then dried to obtain a (meth)acrylic copolymer b.

Production Example 3

Synthesis of (meth)acrylic Copolymer c

A (meth)acrylic copolymer c was obtained in a manner similar to that in Production Example 1, except that 2-phenylbenzylmethacrylate was used instead of 4-phenyl benzylmethacryl ate.

Production Example 4

Synthesis of (meth)acrylic Copolymer d

A (meth)acrylic copolymer d was obtained in a manner similar to that in Production Example 1, except that 4-phenoxybenzylmethacrylate was used instead of 4-phenyl benzylmethacryl ate.

Production Example 5

Synthesis of (meth)acrylic Copolymer e

A (meth)acrylic copolymer e was obtained in a manner similar to that in Production Example 1, except that 4-benzylbenzylmethacrylate was used instead of 4-phenyl benzylmethacryl ate.

Production Example 6

Synthesis of (meth)acrylic Copolymer f

A (meth)acrylic copolymer f was obtained in a manner similar to that in Production Example 1, except that 4,4'-isopropylidene diphenol dimethacrylate was used instead of 9,9'-bis[4-(2-acryloyloxyethoxy)phenyl]fluorene.

Production Example 7

Synthesis of (meth)acrylic Copolymer g

A (meth)acrylic copolymer g was obtained in a manner similar to that in Production Example 1, except that 2,2'-bis[4-(2-methacryloyloxyethoxy)phenyl]propane was used instead of 9,9'-bis[4-(2-acryloyloxyethoxy)phenyl]fluorene.

Production Example 8

Synthesis of (meth)acrylic Copolymer h

A (meth)acrylic copolymer h was obtained in a manner similar to that in Production Example 1, except that the blending amounts of 4-phenylbenzylmethacrylate and 9,9'-bis[4-(2-acryloyloxyethoxy)phenyl]fluorene were changed to 90 parts by mass and 10 parts by mass, respectively.

Production Example 9

Synthesis of (meth)acrylic Copolymer i

A (meth)acrylic copolymer i was obtained in a manner similar to that in Production Example 1, except that the blending amounts of 4-phenylbenzylmethacrylate and 9,9'-bis[4-(2-acryloyloxyethoxy)phenyl]fluorene were changed to 40 parts by mass and 60 parts by mass, respectively.

The compositions and the average particle diameters of the above-described (meth)acrylic copolymers a to i are shown in Table 1.

TABLE 1

| Copolymer | 4-phenyl benzyl methacrylate | 2-phenyl benzyl methacrylate | 4-phenoxy benzyl methacrylate | 4-benzyl benzyl methacrylate | 9,9'-bis [4-(2-acryloyl-oxyethoxy) phenyl]fluorene | 4,4'-isopropylidene diphenol dimethacrylate | 2,2'-bis[4-(2-methacryloyloxy-ethoxy) phenyl] propane | Normal-octyl mercaptan (n-OM) | Average particle diameter (μm) |
|---|---|---|---|---|---|---|---|---|---|
| a | 60 | | | | 40 | | | 0.5 | 16 |
| b | 60 | | | | 40 | | | 0.5 | 25 |
| c | | 60 | | | 40 | | | 0.5 | 18 |
| d | | | 60 | | 40 | | | 0.5 | 22 |
| e | | | | 60 | 40 | | | 0.5 | 19 |
| f | 60 | | | | | 40 | | 0.5 | 20 |
| g | 60 | | | | | | 40 | 0.5 | 19 |
| h | 90 | | | | 10 | | | 0.5 | 19 |
| i | 40 | | | | 60 | | | 0.5 | 19 |

Example 1

20 parts by mass of VYLON 200 (manufactured by Toyobo Co., Ltd., refractive index: 1.556), which is an amorphous polyester resin as a base resin, 10 parts by mass of the (meth)acrylic copolymer a obtained in Production Example 1, 40 parts by mass of toluene and 20 parts by mass of methyl ethyl ketone were mixed together and sufficiently stirred, thereby preparing a resin solution A. Next, the resin solution A was applied to one surface of a polyester film having a thickness of 100 μm as a substrate (manufactured by Toyobo Co., Ltd., COSMOSHINE A4100) (application amount: 20 μm (solid content)), and it was dried at 100° C. for 120 seconds and then subjected to aging at 40° C. for 2 days, thereby obtaining a light diffusion plate.

Example 2

A resin solution B was prepared in a manner similar to that in Example 1, except that the amount of VYLON 200 (manufactured by Toyobo Co., Ltd., refractive index: 1.556), which is an amorphous polyester resin, was changed to 15 parts by mass and that the amount of toluene was changed to 30 parts by mass. Using this resin solution B, a light diffusion plate was produced in a manner similar to that in Example 1.

Example 3

A resin solution C was prepared in a manner similar to that in Example 1, except that the (meth)acrylic copolymer b obtained in Production Example 2 was used. Using this resin solution C, a light diffusion plate was produced in a manner similar to that in Example 1.

Example 4

A resin solution D was prepared in a manner similar to that in Example 1, except that the (meth)acrylic copolymer c obtained in Production Example 3 was used. Using this resin solution D, a light diffusion plate was produced in a manner similar to that in Example 1.

Example 5

A resin solution E was prepared in a manner similar to that in Example 1, except that the (meth)acrylic copolymer d obtained in Production Example 4 was used. Using this resin solution E, a light diffusion plate was produced in a manner similar to that in Example 1.

Example 6

A resin solution F was prepared in a manner similar to that in Example 1, except that the (meth)acrylic copolymer e obtained in Production Example 5 was used. Using this resin solution F, a light diffusion plate was produced in a manner similar to that in Example 1.

Example 7

A resin solution H was prepared in a manner similar to that in Example 1, except that the (meth)acrylic copolymer f obtained in Production Example 6 was used. Using this resin solution H, a light diffusion plate was produced in a manner similar to that in Example 1.

Example 8

A resin solution I was prepared in a manner similar to that in Example 1, except that the (meth)acrylic copolymer g obtained in Production Example 7 was used. Using this resin solution I, a light diffusion plate was produced in a manner similar to that in Example 1.

Example 9

A resin solution J was prepared in a manner similar to that in Example 1, except that the (meth)acrylic copolymer h obtained in Production Example 8 was used. Using this resin solution J, a light diffusion plate was produced in a manner similar to that in Example 1.

Example 10

A resin solution K was prepared in a manner similar to that in Example 1, except that the (meth)acrylic copolymer i obtained in Production Example 9 was used. Using this resin solution K, a light diffusion plate was produced in a manner similar to that in Example 1.

Comparative Example 1

A solution containing 30 parts by mass of VYLON 200 (manufactured by Toyobo Co., Ltd.), which is an amorphous polyester resin as a transparent resin, 40 parts by mass of toluene and 20 parts by mass of methyl ethyl ketone was prepared and sufficiently stirred, thereby obtaining a resin solution G. Next, the resin solution G was applied to one surface of a polyester film having a thickness of 100 μm as a substrate (manufactured by Toyobo Co., Ltd., COSMOSHINE A4100) (application amount: 20 μm (solid content)), and it was dried at 100° C. for 120 seconds and then subjected to aging at 40° C. for 2 days, thereby obtaining a light diffusion plate.

The evaluation results of the light diffusion plates obtained in Examples 1-10 and Comparative Example 1 are shown in Table 2.

TABLE 2

| | (Meth)acrylic copolymer | Refractive index | Total light transmittance (%) | Haze (%) | Pencil hardness |
|---|---|---|---|---|---|
| Example 1 | a | 1.628 | 92.3 | 81.5 | F |
| Example 2 | a | 1.628 | 91.5 | 83.0 | 2H |
| Example 3 | b | 1.627 | 90.9 | 82.2 | F |
| Example 4 | c | 1.628 | 91.0 | 80.9 | F |
| Example 5 | d | 1.604 | 91.2 | 81.2 | F |
| Example 6 | e | 1.602 | 91.0 | 81.3 | F |
| Example 7 | f | 1.597 | 91.1 | 81.5 | F |
| Example 8 | g | 1.594 | 91.5 | 82.0 | F |
| Example 9 | h | 1.62 | 91.4 | 81.4 | F |
| Example 10 | i | 1.632 | 90.5 | 81.9 | F |
| Comparative Example 1 | — | — | 93.0 | 3.5 | B |

According to Table 2, it is understood that a molded body excellent in light diffusibility and light transmission properties with high hardness can be produced by using the light diffusing agent of the present invention ((meth)acrylic copolymers a to i).

In particular, it is understood that it is possible to improve light diffusibility (haze) and hardness while suppressing reduction in light transmission properties more in Example 2, in which the blending ratio of the light diffusing agent relative to the polyester resin as the base resin was increased, compared to Example 1, in which the same light diffusing agent was used.

The several embodiments of the present invention were described above, but these embodiments were presented as examples and it is not intended to limit the scope of the invention thereby. These novel embodiments can be practiced in other various modes and can be omitted, substituted or modified variously without departing from the gist of the present invention. These embodiments and modifications thereof are included in the scope or gist of the invention and also included in the scope of the inventions recited in the claims and equivalents thereof.

The invention claimed is:
1. A polymer microparticle consisting of a copolymer which contains:
    a (meth)acrylate structural unit (A) represented by formula (1); and
    a polyvalent vinyl structural unit (B) that is copolymerized with the structural unit (A)

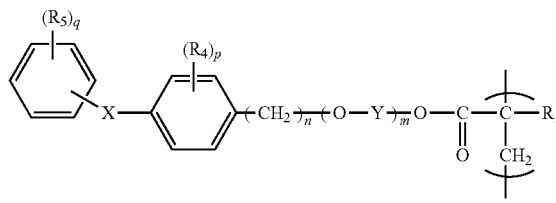

wherein:
X represents a divalent group selected from the group consisting of a single bond, —C($R_2$)($R_3$)—, —C(=O)—, —O—, —OC(=O)—, —OC(=O)O—, —S—, —SO—, —$SO_2$— and any combination thereof, wherein $R_2$ and $R_3$ each independently represent a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a phenylphenyl group; or $R_2$ and $R_3$ may be bonded to each other so as to form a cyclic alkyl group having 3 to 10 carbon atoms together with a carbon atom to which they are attached;
Y represents a branched or unbranched alkylene group having 2 to 6 carbon atoms, a cycloalkylene group having 6 to 10 carbon atoms or an arylene group having 6 to 10 carbon atoms;
$R_1$ represents a hydrogen atom or a methyl group;
$R_4$ and $R_5$ each independently represent a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a phenylphenyl group;
m represents an integer of 0 to 10;
n represents an integer of 1 or 2;
p represents an integer of 0 to 4; and
q represents an integer of 0 to 5;

wherein the structural unit (A) is contained in an amount of 10 to 90% by mass relative to the copolymer, and wherein the structural unit (B) is contained in an amount of 10 to 90% by mass relative to the copolymer, and any other structural units are contained in an amount 10% by mass or less; and
wherein the structural unit (B) comprises a structural unit derived from a compound represented by formula (2) or a structural unit derived from a compound represented by formula (3)

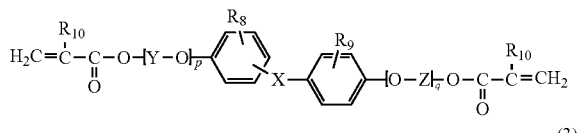

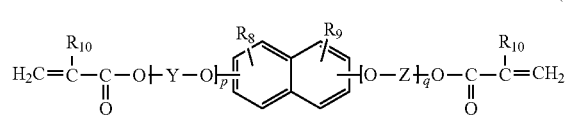

wherein in formula (2):
X represents a divalent group selected from a single bond, —[C($R_6$)($R_7$)]$_n$—, —C(=O)—, —O—, —SO— and —$SO_2$—, wherein $R_6$ and $R_7$ are each independently selected from a hydrogen atom, a phenyl group and a phenylphenyl group; or $R_6$ and $R_7$ are bonded to each other so as to form a cyclic alkyl group having 3 to 13 carbon atoms together with a carbon atom to which they are attached; and n represents an integer of 1 to 10;
$R_8$ and $R_9$ are each independently selected from a hydrogen atom, an alkyl group having 1 to 20 carbon atoms, an alkoxyl group having 1 to 20 carbon atoms, a cycloalkyl group having 3 to 20 carbon atoms, a cycloalkoxyl group having 5 to 20 carbon atoms, an aryl group having 6 to 20 carbon atoms, an aryloxy group having 6 to 20 carbon atoms, and a halogen atom;
$R_{10}$ represents a hydrogen atom or a methyl group;
Y and Z each independently represent a branched or unbranched alkylene group having 2 to 6 carbon atoms, a cycloalkylene group having 6 to 10 carbon atoms or an arylene group having 6 to 10 carbon atoms; and
p and q each independently represent an integer of 0 to 4; and
in formula (3):
X represents a divalent group selected from a single bond, —[C($R_6$)($R_7$)]$_n$—, —C(=O)—, —O—, —SO— and —$SO_2$—, wherein $R_6$ and $R_7$ are each independently selected from a hydrogen atom, a methyl group, a phenyl group and a phenylphenyl group; or $R_6$ and $R_7$ are bonded to each other so as to form a cyclic alkyl group having 3 to 13 carbon atoms together with a carbon atom to which they are attached; and n represents an integer of 1 to 10;
$R_8$ and $R_9$ are each independently selected from a hydrogen atom, an alkyl group having 1 to 20 carbon atoms, an alkoxyl group having 1 to 20 carbon atoms, a cycloalkyl group having 3 to 20 carbon atoms, a cycloalkoxyl group having 5 to 20 carbon atoms, an aryl group having 6 to 20 carbon atoms, an aryloxy group having 6 to 20 carbon atoms, and a halogen atom;

R$_{10}$ represents a hydrogen atom or a methyl group;

Y and Z each independently represent a branched or unbranched alkylene group having 2 to 6 carbon atoms, a cycloalkylene group having 6 to 10 carbon atoms or an arylene group having 6 to 10 carbon atoms; and p and q each independently represent an integer of 0 to 4.

2. The polymer microparticle according to claim 1, wherein m represents an integer of 0 to 3.

3. The polymer microparticle according to claim 1, wherein X in formula (1) represents a single bond, —C(R$_2$)(R$_3$)—, —C(=O)—, —O—, —SO—, or —SO$_2$—.

4. The polymer microparticle according to claim 1, wherein both p and q represent 0.

5. The polymer microparticle according to claim 1, wherein the structural unit (B) is a bisphenol-based divinyl structural unit.

6. The polymer microparticle according to claim 1, wherein the structural unit (B) is a naphthyl-based divinyl structural unit.

7. The polymer microparticle according to claim 1, wherein the polymer microparticle has an average particle diameter of 0.1 to 100 µm.

8. The polymer microparticle according to claim 1, wherein the (meth)acrylate structural unit represented by formula (1) is derived from only one selected from the group consisting of 4-phenylbenzyl(meth)acrylate, 3-phenylbenzyl(meth)acrylate, 2-phenylbenzyl(meth)acrylate, 4-biphenylbenzyl(meth)acrylate, 3-biphenylbenzyl(meth)acrylate, 2-biphenylbenzyl(meth)acrylate, 4-benzylbenzyl(meth)acrylate, 3-benzylbenzyl(meth)acrylate, 2-benzylbenzyl(meth)acrylate, 4-phenethylbenzyl(meth)acrylate, 3-phenethylbenzyl(meth)acrylate, 2-phenethylbenzyl(meth)acrylate, 4-phenethylphenethyl(meth)acrylate, 3-phenethylphenethyl(meth)acrylate, 2-phenethylphenethyl(meth)acrylate, 4-(4-methylphenyl)benzyl(meth)acrylate, 3-(4-methylphenyl)benzyl(meth)acrylate, 2-(4-methylphenyl)benzyl(meth)acrylate, 4-(4-methoxyphenyl)benzyl(meth)acrylate, 3-(4-methoxyphenyl)benzyl(meth)acrylate, 2-(4-methoxyphenyl)benzyl(meth)acrylate, 4-(4-bromophenyl)benzyl(meth)acrylate, 3-(4-bromophenyl)benzyl(meth)acrylate, 2-(4-bromophenyl)benzyl(meth)acrylate, 4-benzoylbenzyl(meth)acrylate, 3-benzoylbenzyl(meth)acrylate, 2-benzoylbenzyl(meth)acrylate, 4-(phenylsulfinyl)benzyl(meth)acrylate, 3-(phenylsulfinyl)benzyl(meth)acrylate, 2-(phenylsulfinyl)benzyl(meth)acrylate, 4-(phenylsulfonyl)benzyl(meth)acrylate, 3-(phenylsulfonyl)benzyl(meth)acrylate, 2-(phenylsulfonyl)benzyl(meth)acrylate, 4-((phenoxycarbonyl)oxy)benzyl(meth)acrylate, 3-((phenoxycarbonyl)oxy)benzyl(meth)acrylate, 2-((phenoxycarbonyl)oxy)benzyl(meth)acrylate, 4-(((meth)acryloxy)methyl)phenyl benzoate, 3-(((meth)acryloxy)methyl)phenyl benzoate, 2-(((meth)acryloxy)methyl)phenyl benzoate, phenyl 4-(((meth)acryloxy)methyl)benzoate, phenyl 3-(((meth)acryloxy)methyl)benzoate, phenyl 2-(((meth)acryloxy)methyl)benzoate, 4-(1-phenylcyclohexyl)benzyl(meth)acrylate, 3-(1-phenylcyclohexyl)benzyl(meth)acrylate, 2-(1-phenylcyclohexyl)benzyl(meth)acrylate, 4-phenoxybenzyl(meth)acrylate, 3-phenoxybenzyl(meth)acrylate, 2-phenoxybenzyl(meth)acrylate, 4-(phenylthio)benzyl(meth)acrylate, 3-(phenylthio)benzyl(meth)acrylate, 2-(phenylthio)benzyl(meth)acrylate, and 3-methyl-4-(2-methylphenyl)benzylmethacrylate.

9. A light diffusing agent comprising the polymer microparticle according to claim 1.

10. A light diffusing resin composition containing a base resin and the light diffusing agent according to claim 9.

11. The light diffusing resin composition according to claim 10, wherein the base resin is selected from the group consisting of a polycarbonate-based resin, a polyester-based resin and an acrylic resin.

12. The light diffusing resin composition according to claim 10, wherein the light diffusing agent is contained in an amount of 10 to 100 parts by mass relative to 100 parts by mass of the base resin.

13. The polymer microparticle according to claim 1, wherein in formula (2), X is a divalent fluorene.

* * * * *